United States Patent
Wallace et al.

(10) Patent No.: US 10,193,231 B2
(45) Date of Patent: Jan. 29, 2019

(54) DUAL-FREQUENCY PATCH ANTENNAS

(71) Applicant: Trimble Inc., Sunnyvale, CA (US)

(72) Inventors: Gregory C. Wallace, Arvada, CO (US); John Atkinson, Christchurch (NZ)

(73) Assignee: Trimble Inc., Sunnyvale, CA (US)

( * ) Notice: Subject to any disclaimer, the term of this patent is extended or adjusted under 35 U.S.C. 154(b) by 499 days.

(21) Appl. No.: 14/635,371

(22) Filed: Mar. 2, 2015

(65) Prior Publication Data

US 2016/0261047 A1     Sep. 8, 2016

(51) Int. Cl.
| | | |
|---|---|---|
| *H01Q 1/48* | (2006.01) | |
| *H01Q 1/52* | (2006.01) | |
| *H01Q 5/40* | (2015.01) | |
| *H01Q 9/04* | (2006.01) | |
| *G01S 19/32* | (2010.01) | |
| *G01S 19/36* | (2010.01) | |

(Continued)

(52) U.S. Cl.
CPC ........... *H01Q 9/0407* (2013.01); *G01S 19/32* (2013.01); *G01S 19/36* (2013.01); *H01Q 1/48* (2013.01); *H01Q 1/521* (2013.01); *H01Q 5/335* (2015.01); *H01Q 5/378* (2015.01); *H01Q 5/40* (2015.01); *H01Q 9/045* (2013.01); *H01Q 9/0414* (2013.01)

(58) Field of Classification Search
CPC ...... H01Q 9/0407; H01Q 5/335; H01Q 5/378; H01Q 5/40; H01Q 1/48; H01Q 1/521; H01Q 9/0414; H01Q 9/045; H01Q 13/00; H01Q 1/38; H01Q 1/2143; H01Q 5/45; H01Q 1/243; H01Q 21/29; H01Q 9/0435; H01Q 1/246; H01Q 1/362; H01Q 19/191; H01Q 7/00; H01Q 15/0086; G01S 19/32; G01S 19/36; G01S 19/41; G01R 31/3025

USPC .................................................... 342/357.72
See application file for complete search history.

(56) References Cited

U.S. PATENT DOCUMENTS

| | | | |
|---|---|---|---|
| 4,070,676 A | * | 1/1978 | Sanford .............. H01Q 9/0414 343/700 MS |
| 5,515,057 A | | 5/1996 | Lennen et al. |

(Continued)

FOREIGN PATENT DOCUMENTS

| | | | | |
|---|---|---|---|---|
| EP | | 2913888 B1 * | 11/2016 | ............. H01Q 5/328 |
| WO | WO | 9959223 A2 * | 11/1999 | ............. H01Q 1/246 |

(Continued)

OTHER PUBLICATIONS

"A Three-Dimensional Active Antenna for High-Speed Wireless Communication Application"—Tomohiro Seki et al., NTT Wireless Systems Laboratories, Japan—pp. 975-978, Jun. 1997.*

*Primary Examiner* — Bernarr E Gregory
*Assistant Examiner* — Nuzhat Pervin
(74) *Attorney, Agent, or Firm* — Kilpatrick Townsend & Stockton LLP (57) ABSTRACT

A dual-frequency patch antenna includes a first conductive element configured to receive global navigation satellite system (GNSS) signals at a first frequency band, a second conductive element configured to receive GNSS signals at a second frequency band, and a ground plane. A first dielectric material is disposed between the first conductive element and the second conductive element, and a second dielectric material disposed between the second conductive element and the ground plane. The second dielectric material has a topside with an area at least as large as the topside of the ground plane.

20 Claims, 8 Drawing Sheets

(51) Int. Cl.
*H01Q 5/335* (2015.01)
*H01Q 5/378* (2015.01)

(56) References Cited

U.S. PATENT DOCUMENTS

| | | | |
|---|---|---|---|
| 5,625,365 A | 4/1997 | Tom et al. | |
| 5,678,169 A | 10/1997 | Turney | |
| 5,694,136 A | 12/1997 | Westfall | |
| 5,805,108 A | 9/1998 | Lennen | |
| 5,911,454 A | 6/1999 | Crothall | |
| 5,917,454 A | 6/1999 | Hill et al. | |
| 6,014,114 A | 1/2000 | Westfall et al. | |
| 6,118,406 A * | 9/2000 | Josypenko | H01Q 1/38 343/700 MS |
| 6,204,819 B1 * | 3/2001 | Hayes | H01Q 1/243 343/700 MS |
| 6,218,992 B1 * | 4/2001 | Sadler | H01Q 1/243 343/702 |
| 6,307,509 B1 | 10/2001 | Krantz | |
| 6,529,749 B1 * | 3/2003 | Hayes | H01Q 1/243 343/702 |
| 6,662,028 B1 * | 12/2003 | Hayes | H01Q 1/243 343/908 |
| 6,836,247 B2 * | 12/2004 | Soutiaguine | H01Q 9/0414 343/700 MS |
| 7,277,056 B1 * | 10/2007 | Thiam | H01Q 9/0414 343/700 MS |
| 7,315,278 B1 | 1/2008 | Bauregger et al. | |
| 7,429,952 B2 * | 9/2008 | Sun | H01Q 9/0435 343/700 MS |
| 9,520,651 B2 * | 12/2016 | Astakhov | H01Q 1/48 |
| 9,590,314 B2 * | 3/2017 | Celik | H01Q 15/0086 |
| 2003/0043086 A1 * | 3/2003 | Schaffner | G01S 19/11 343/909 |
| 2003/0146872 A1 * | 8/2003 | Kellerman | H01Q 9/0414 343/700 MS |
| 2005/0242990 A1 * | 11/2005 | Lawrence | G01S 19/32 342/357.72 |
| 2007/0060222 A1 * | 3/2007 | Finn | H01Q 1/2266 455/575.7 |
| 2010/0309085 A1 * | 12/2010 | Pera | H01Q 19/191 343/840 |
| 2014/0247194 A1 * | 9/2014 | Durnan | H01Q 7/00 343/867 |
| 2014/0292569 A1 * | 10/2014 | Wallace | G01S 19/43 342/357.42 |
| 2014/0292570 A1 * | 10/2014 | Wallace | G01S 19/41 342/357.42 |
| 2015/0160264 A1 * | 6/2015 | Rada | G01R 31/2822 324/754.21 |
| 2016/0020521 A1 * | 1/2016 | Astakhov | H01Q 1/48 343/769 |
| 2016/0070001 A1 * | 3/2016 | Krantz | H01Q 1/362 342/357.72 |

FOREIGN PATENT DOCUMENTS

| | | | | |
|---|---|---|---|---|
| WO | WO-9959223 A2 * | 11/1999 | | H01Q 1/246 |
| WO | WO 2016036617 A1 * | 3/2016 | | H01Q 1/362 |
| WO | WO-2016036617 A1 * | 3/2016 | | H01Q 1/362 |

* cited by examiner

DUAL-FREQUENCY PATCH ANTENNAS

FIELD OF THE INVENTION

Embodiments described herein relate generally to dual-frequency patch antennas and methods for forming parts of dual-frequency patch antennas using printed circuit board assembly (PCBA) processes.

BACKGROUND

Patch (or microstrip) antennas typically include a flat metal sheet mounted over a larger metal ground plane. The flat metal sheet usually has a rectangular shape, and the metal layers are generally separated using a dielectric spacer. The flat metal sheet has a length of approximately $\lambda/2$, and width can be optimized to provide a desired input impedance. Patch antennas can be configured to provide linear or circular polarization.

Dual-frequency patch antennas typically include two flat metal sheets mounted over a larger ground plane. Dual-frequency patch antennas exhibit a dual-resonant behavior in a single radiating structure, and they are often used in applications where increased bandwidth is needed or for operating at two separate sub-bands. Global navigation satellite system (GNSS) receivers often use right-handed circularly polarized (RHCP) dual-frequency patch antennas to receive GNSS signals at different frequencies (e.g., L1, L2, L2C, L3, L4, L5, and other GNSS frequencies).

Patch antennas are popular because of their simple design, low profile, light weight, and low cost. Improved designs are constantly sought to improve performance and further reduce cost.

SUMMARY

Embodiments described herein provide dual-frequency patch antennas that may be smaller, lighter, and/or lower cost than conventional dual-frequency patch antennas. In accordance with an embodiment, for example, a dual-frequency patch antenna includes a first conductive element configured to receive global navigation satellite system (GNSS) signals at a first frequency band and a first dielectric material coupled to a backside of the first conductive element. A second conductive element is coupled to a backside of the first dielectric material. The second conductive element is configured to receive GNSS signals at a second frequency band. The second conductive element has a topside with an area at least as large as a topside of the first conductive element. A second dielectric material is coupled to a backside of the second conductive element. A ground plane is coupled to a backside of the second dielectric material, and a third dielectric material is coupled to a backside of the ground plane. A routing and placement layer with circuitry is coupled to a backside of the third dielectric material. The circuitry is electrically coupled to at least one of the first conductive element or the second conductive element. A digital cable is coupled to the circuitry via the routing and placement layer. The circuitry is configured to provide frequency selection, down conversion, and digitization of the GNSS signals at the first frequency band and the GNSS signals at the second frequency band. The circuitry is also configured to output digitized baseband signals. The digital cable is configured to provide the digitized baseband signals to a soft GNSS receiver.

In an embodiment, the GNSS signals at the first frequency band are L1 GNSS signals, and the GNSS signals at the second frequency band are at least one of L2 GNSS signals, L2C GNSS signals, or L5 GNSS signals.

In another embodiment, the digital cable is a universal serial bus (USB) cable or an Ethernet cable.

In another embodiment, the third dielectric material comprises one or more conductive routing layers each disposed between adjacent dielectric layers.

In another embodiment, edges of the first conductive element and the first dielectric material are rotated by about 45° relative to edges of the second conductive element and the second dielectric material.

In another embodiment, the dual-frequency patch antenna also includes one or more feeds electrically coupling the first conductive element to the circuitry. The second conductive element may be electrically isolated from the circuitry and capacitively coupled to the first conductive element.

In yet another embodiment, one or more PCBA processes are used to form one or more of the first conductive element, the second conductive element, the ground plane, the first dielectric material, the second dielectric material, and the third dielectric material of the dual-frequency patch antenna.

In accordance with another embodiment, a dual-frequency patch antenna includes a first conductive element configured to receive GNSS signals at a first frequency band, a second conductive element configured to receive GNSS signals at a second frequency band, a ground plane, and circuitry electrically coupled to at least one of the first conductive element or the second conductive element. The circuitry is configured to provide at least frequency selection of the GNSS signals at the first frequency band and the GNSS signals at the second frequency band. A first dielectric material is disposed between the first conductive element and the second conductive element, a second dielectric material disposed between the second conductive element and the ground plane, and a third dielectric material disposed between the ground plane and the circuitry. The second dielectric material has a topside with an area at least as large as a topside of the ground plane. An output is coupled to the circuitry via a routing and placement layer. The output is configured to provide at least filtered and amplified GNSS signals from the circuitry.

In an embodiment, the circuitry is also configured to provide down conversion and digitization of the GNSS signals at the first frequency band and the GNSS signals at the second frequency band and to provide the digitized baseband signals to the output.

In another embodiment, the circuitry comprises a first circuitry and a second circuitry, and the patch antenna also includes an interface coupled to the first circuitry via a first routing and placement layer and to the second circuitry via a second routing and placement layer. The interface is configured to provide the filtered and amplified GNSS signals from the first circuitry to the second circuitry. The second circuitry is configured to provide down conversion and digitization of the filtered and amplified GNSS signals and to provide the digitized baseband signals to the output.

In another embodiment, the circuitry comprises a first circuitry and a second circuitry, and the first circuitry is further configured to provide down conversion of the GNSS signals at the first frequency band and the GNSS signals at the second frequency band. The dual-frequency patch antenna also includes an interface coupled to the first circuitry via a first routing and placement layer and to the second circuitry via a second routing and placement layer. The interface is configured to provide filtered, amplified, and down converted GNSS signals from the first circuitry to the second circuitry. The second circuitry is configured to provide digitization of the filtered, amplified, and down converted GNSS signals and to provide the digitized baseband signals to the output.

In yet another embodiment, the circuitry includes elements to filter, amplify, downconvert, and digitize the GNSS signals at the first frequency band and the GNSS signals at the second frequency band, but does not include elements to perform pseudorange and carrier phase measurements.

In accordance with yet another embodiment, a dual-frequency patch antenna includes a first conductive element configured to receive GNSS signals at a first frequency band, a second conductive element configured to receive GNSS signals at a second frequency band, and a ground plane. A first dielectric material is disposed between the first conductive element and the second conductive element, and a second dielectric material disposed between the second conductive element and the ground plane. The second dielectric material has a topside with an area at least as large as the topside of the ground plane.

In an embodiment, the first dielectric material has a topside with an area that is substantially the same size as the topside of the second dielectric material.

Numerous benefits are achieved using embodiments described herein over conventional structures and techniques. For example, in some embodiments, a dual-frequency patch antenna that includes circuitry for frequency selection, down conversion, and/or digitization may be formed using a vertical stack of three dielectric layers, three conductive layers, and a circuitry layer (or a routing and placement layer with circuitry). Compared to conventional dual frequency patch antennas, a more compact stacked structure that may include fewer layers can reduce size, weight, and/or lower cost.

In some embodiments, the routing and placement layer with circuitry may be formed below the ground plane. In these embodiments, the routing and placement layer may be separated from the ground plane by a bottom dielectric layer (one of the three dielectric layers). Forming the circuitry below the ground plane can also reduce size, weight, and/or lower cost compared to conventional structures that form the circuitry adjacent to the ground plane or on a separate board.

Also, in some embodiments, the circuitry layer may be coupled to an output that is configured to provide digitized baseband signals from the circuitry to a digital cable. The digital cable may provide the digitized baseband signals to a processing device, such as a cell phone or a tablet computer, where pseudorange and carrier phase measurements are performed.

Depending on the embodiment, one or more of these benefits may exist. These and other benefits are described throughout the specification with reference to the appended drawings.

DETAILED DESCRIPTION

Embodiments described herein provide dual-frequency patch antennas and methods for forming parts of dual-frequency patch antennas using PCBA processes. In some embodiments, a dual-frequency patch antenna that includes circuitry for frequency selection, down conversion, and/or digitization may be formed using a vertical stack of dielectric layers, conductive layers, and circuitry. One or more of the dielectric layers and conductive layers, as well as the circuitry, may be formed using PCBA processes.

In some embodiments, the circuitry may include elements to filter, amplify, downconvert, and digitize GNSS signals, but may not include elements to perform pseudorange and carrier phase measurements. In these embodiments, the pseudorange and carrier phase measurements, as well as the application of any corrections, may be performed by a communication device that is configured with a software-defined GNSS receiver (soft GNSS receiver). The dual-frequency patch antenna may be removably coupled with the communication device.

The communication device is not limited and may be any device such as a cell phone, a tablet computer, or the like with computing capabilities for processing digitized baseband signals at typical sampling rates. The communication device may be configured in accordance with known techniques to perform conventional GNSS measurements and determine position fixes associated with the dual-frequency patch antenna.

The soft GNSS receiver may run as software on one or more processors that are part of the communication device. A digital cable, such as a USB cable, an Ethernet cable, or the like, may be used to provide digitized baseband signals from the circuitry of the patch antenna to the soft GNSS receiver of the communication device.

Figure 1A:
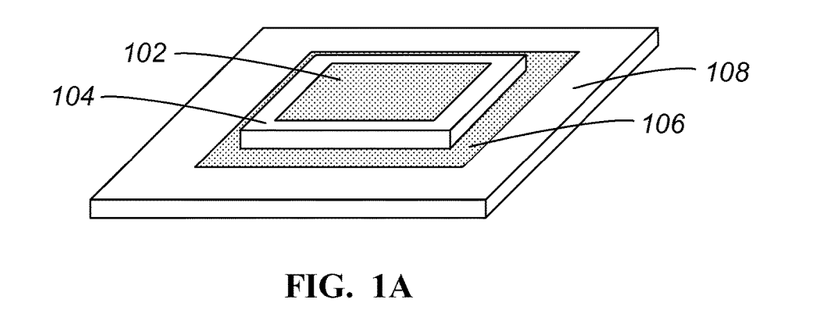
FIGS. 1A-1E are simplified diagrams of dual-frequency patch antennas in accordance with some embodiments.

FIG. 1A is a simplified perspective view of a dual-frequency patch antenna in accordance with an embodiment. The patch antenna includes a first conductive element 102 configured to receive GNSS signals at a first frequency band and a second conductive element 106 configured to receive GNSS signals at a second frequency band.

A first dielectric material 104 is coupled to a backside of the first conductive element 102, and the second conductive element 106 is coupled to a backside of the first dielectric material 104. A second dielectric material 108 is coupled to a backside of the second conductive element 106. The dielectric materials 104, 108 may be coupled to the conductive elements 102, 106 using known PCBA processes and adhesives.

Figure 1B:
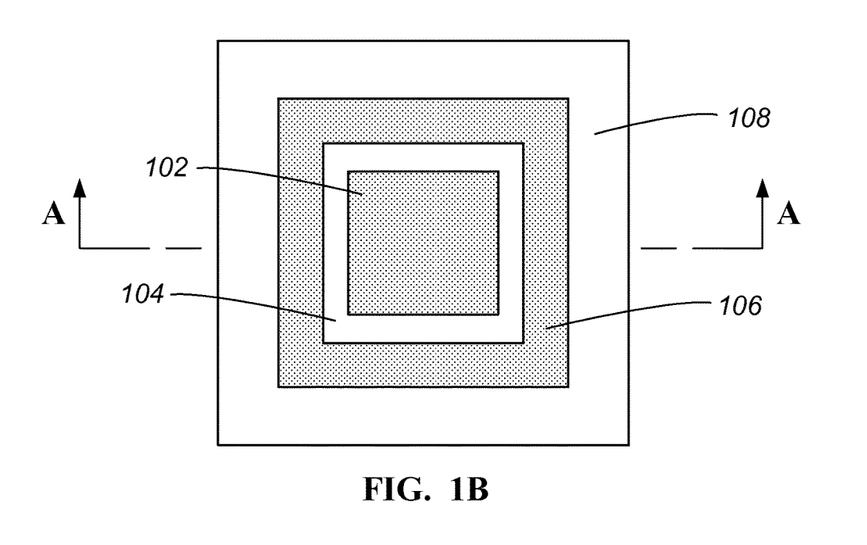

FIG. 1B is a simplified plan view of the dual-frequency patch antenna shown in FIG. 1A. This figure shows the conductive elements 102, 106 and the dielectric materials 104, 108. In this embodiment, the second conductive element 106 has a topside with an area that is larger than a topside of the first conductive element 102, but in other embodiments, the second conductive element 106 may have a topside with an area that is approximately the same size as the topside of the first conductive element 102.

Figure 1C:
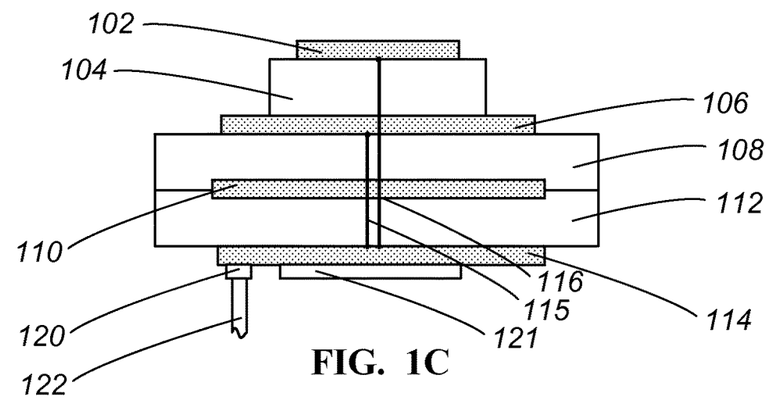
Figure 1D:
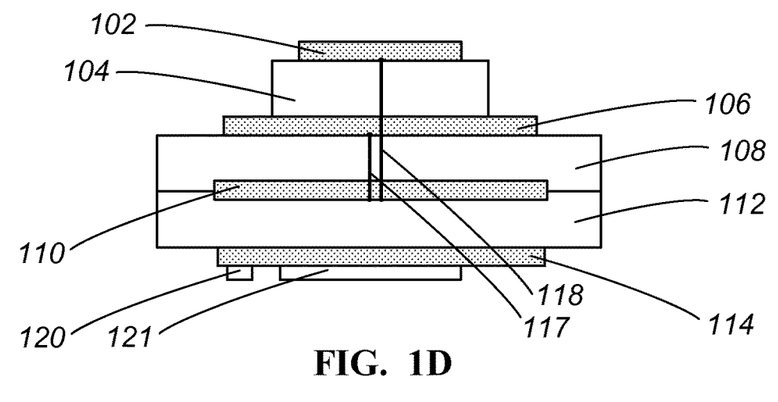
Figure 1E:
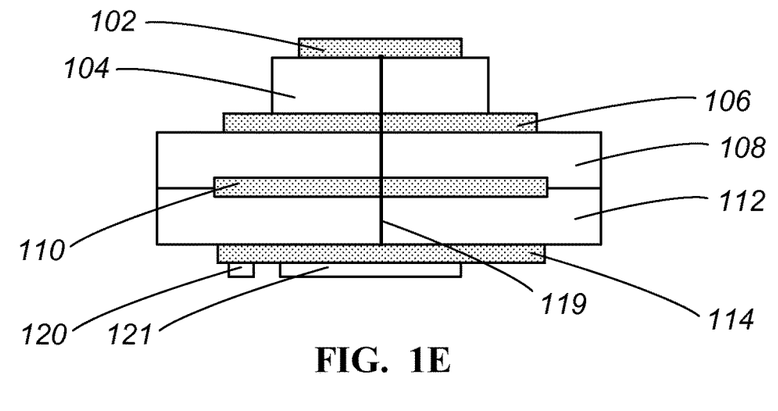

As shown in the cross-sectional views of FIGS. 1C-1E, the patch antenna also includes a ground plane 110 coupled to a backside of the second dielectric material 108, a third dielectric material 112 coupled to a backside of the ground plane 110, and a routing and placement layer 114 with circuitry 121 coupled to a backside of the third dielectric layer coupled to a backside of the third dielectric layer. The ground plane 110 typically has a topside with an area at least as large or larger than a topside of the second conductive element 106. In some embodiments, the second dielectric material 108 has a topside with an area that is at least as large as the topside of the ground plane 110.

The dielectric materials 104, 108, 112 are not limited and may include any solid or laminate dielectric materials such as ceramics, printed circuit board (PCB) cores, pre-preg layers, or the like. Thickness and dielectric constant of the dielectric materials 104, 108 may be determined in accordance with known techniques based on desired operating conditions of the patch antenna (e.g., radiation patterns, coupling between patches, etc.). The dielectric materials 104, 108, 112 may each have the same or different thicknesses and dielectric constants. In some embodiments, the second dielectric material 108 has a topside with an area that is larger than a topside of the first dielectric material 104.

Although not shown, the third dielectric material 112 may include one or more conductive routing layers each disposed between adjacent dielectric layers (e.g., pre-preg layers). Each of the conductive routing layers may be electrically coupled to other conductive routing layers, the routing and placement layer 114, the circuitry 121, and/or one or more feeds. The routing layers may include vias and/or conductive traces that provide electrical coupling between the circuitry 121 (or components of the circuitry 121) and the first conductive element 102 and/or the second conductive element 106. The electrical coupling is provided via the routing and placement layer 114 and one or more feeds (e.g., feeds 115, 116, 117, 118, 119—described more fully below).

The conductive elements 102, 106 and the ground plane 110 are not limited and may include any conductive material such as a metal, alloy, or the like. In some embodiments, the conductive elements 102, 106 and the ground plane 110 may be thin copper sheets that are formed in a desired shape using known PCBA processes and etching techniques. The conductive elements 102, 106 and the ground plane 110 are typically rectangular shaped, but may be other shapes including circular. The size and shape of the conductive elements 102, 106 are determined in accordance with known techniques based on desired operating conditions of the patch antenna (e.g., operating frequencies, bandwidths, input impedances, etc.).

In some embodiments, the first conductive element 102 is configured to receive L1 GNSS signals and the second conductive element 106 is configured to receive either L2 GNSS signals (where the L2 GNSS signals may be either L2 or L2C GNSS signals), L5 GNSS signals, or any other GNSS signals (e.g., L3 or L4 GNSS signals). The conductive elements 102, 106 are not limited, however, and each conductive element may be configured to receive signals at any particular GNSS frequency. For example, the second conductive element 106 may be configured to receive L1 GNSS signals, and the first conductive element 102 may be configured to receive signals at another GNSS frequency.

FIGS. 1C-1E are simplified cross-sectional views along line A-A in FIG. 1B and show different embodiments of dual-frequency patch antennas. Each of the embodiments shown in FIGS. 1C-1E include the conductive elements 102, 106 and the dielectric materials 104, 108 as shown in FIGS. 1A-1B, as well as the ground plane 110, the third dielectric material 112, the routing and placement layer 114, and the circuitry 121 described above.

The circuitry 121 may include conventional electronic components for providing at least frequency selection of GNSS signals received by the conductive elements 102, 106. In some embodiments, the circuitry 121 may also include conventional electronic components for providing down conversion of the GNSS signals, and in other embodiments, the circuitry 121 may also include conventional electronic components for providing down conversion and digitization of the GNSS signals. The electronic components may be mounted on a circuit board in accordance with known techniques. Although not specifically shown in the figures, the electronic components may include one or more known components such as filters, low noise amplifiers (LNAs), down converters, analog to digital (A/D) converters, processors, and/or the like. The one or more processors may be configured to package the GNSS signals for output from the circuitry 121 at output 120. Also, the routing and placement layer 114 may include one or more layers of conductive traces that provide electrical coupling between the components of the circuitry 121 and the conductive elements 102, 106. Although the routing and placement layer 114 shown in these embodiments is approximately the same size (in cross section) as the ground plane 110, a surface area of the routing and placement layer 114 is not limited and may be either smaller, the same size, or larger than that of the ground plane 110.

The output 120 may provide an interface between the circuitry 121 and a soft GNSS receiver separate from the dual-frequency patch antenna. As described previously, the soft GNSS receiver may run as software on a separate communication device. The output 120 may provide the GNSS signals using known wireless techniques (e.g., Bluetooth) or via a digital cable 122 as shown in FIG. 1C. The digital cable may include a USB cable (e.g., USB 2.0 high speed, USB 3.0, etc.), an Ethernet cable, or the like, and may be used to provide the GNSS signals from the circuitry 121 of the patch antenna to the soft GNSS receiver of the communication device. Although not specifically shown in some of the figures, each of the embodiments of dual-frequency patch antennas described herein may provide the GNSS signals from the circuitry either wirelessly or via a digital cable. Depending on the embodiment, the GNSS signals output from the circuitry 121 may be either frequency selected and amplified GNSS signals; frequency selected, amplified, and downconverted GNSS signals; or frequency selected, amplified, downconverted, and digitized GNSS signals (digitized baseband signals).

The embodiments shown in FIGS. 1C-1E also include one or more feeds (feeds 115, 116, 117, 118, 119). The feeds are for electrically coupling the circuitry 121 to the first conductive element 102 and/or the second conductive element 106 via the routing and placement layer 114. For example, the embodiment shown in FIG. 1C includes a first feed 115 coupling the circuitry 121 to the second conductive element 106 and a second feed 116 coupling the circuitry 121 to the first conductive element 102. The feeds 115, 116 provide energy from the conductive elements 102, 106 to the circuitry 121.

The embodiment shown in FIG. 1D includes a first feed 117 coupling the circuitry 121 to the second conductive element 106 and a second feed 118 coupling the circuitry 121 to the first conductive element 102. In this embodiment, the feeds 117, 118 terminate in the third dielectric material 112 and are coupled to the circuitry 121 by one or more routing layers (not shown).

The embodiment shown in FIG. 1E includes a single feed 119 coupling the circuitry 121 to the first conductive element 102. While the second conductive element 106 is electrically isolated from the circuitry 121 in this embodiment, the second conductive element is capacitively coupled to the first conductive element 102 (and hence capacitively coupled to the circuitry 121). In other embodiments, a single feed may be used in a similar manner to couple the circuitry 121 to the second conductive element 106 leaving the first conductive element 102 electrically isolated from, but capacitively coupled to, the circuitry 121. Polarization of the dual-frequency patch antenna may be determined in accordance with known techniques based on feed location on the conductive elements 102, 106.

The feeds 115, 116, 117, 118, 119 are shown merely as examples of some of the feed configurations that may be used with embodiments of dual-frequency patch antennas described herein. The dual-frequency patch antennas described herein, however, are not limited to these or any other feed configurations. For example, one or both of the conductive elements may have dual feeds in some embodiments. Further, many details associated with the feeds are not included in the figures. For example, the feeds typically pass through a hole or aperture in the ground plane that provides isolation from the ground plane. Also, the feeds that are coupled to the top conductive element (the first conductive element 102) may pass through a hole or aperture in the bottom conductive element (the second conductive element 106) that provides isolation from the bottom conductive element. Additionally, the feeds may be coupled with the conductive elements at different locations in accordance with known techniques based on desired polarization characteristics. Also, the feeds may be coupled at various points (e.g., top or bottom) of the conductive elements and the routing and placement layer, and the feeds may extend horizontally before extending vertically through the dielectric layers or even wrap around the dielectric layers in some embodiments. Thus, the examples shown in FIGS. 1C-1E merely provide some of the general feed configurations that may be used with the embodiments of dual-frequency patch antennas that are within the scope of this disclosure. And while all of the embodiments may include feeds, the feeds are not specifically shown in any of the other figures.

Figure 2A:
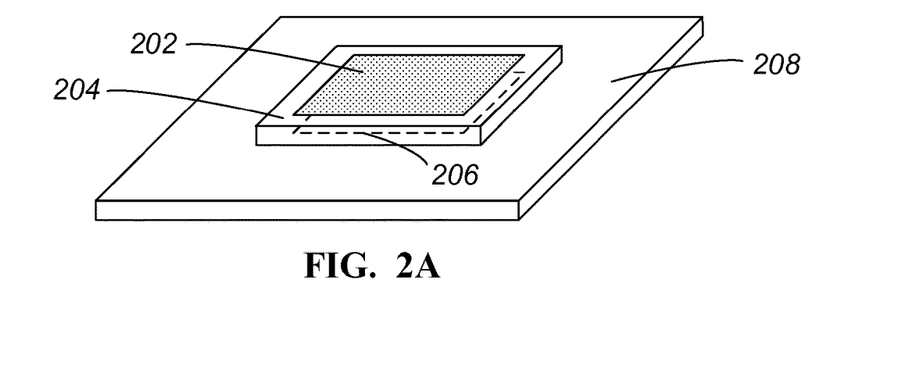
FIGS. 2A-2C are simplified diagrams of a dual-frequency patch antenna in accordance with an embodiment.
Figure 2B:
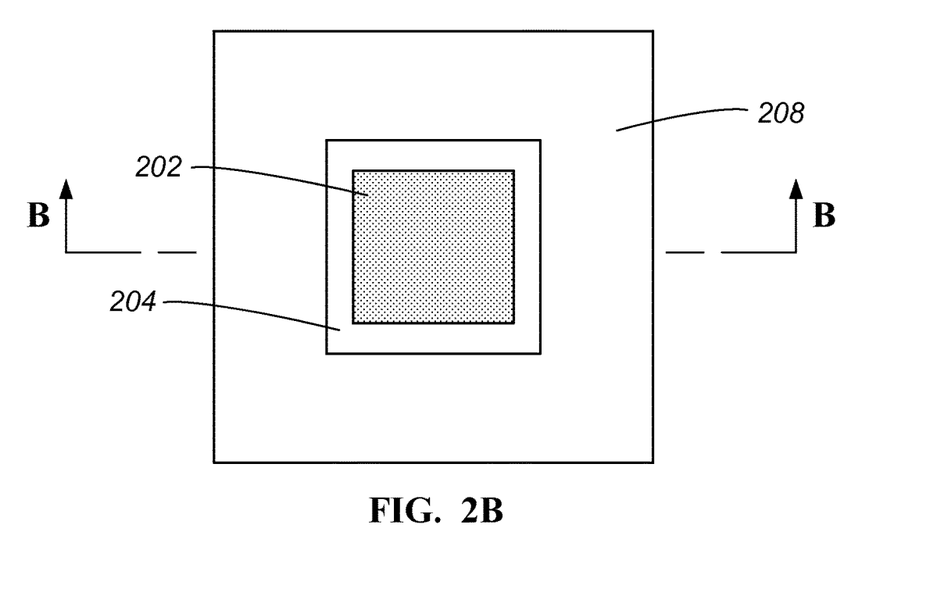
Figure 2C:
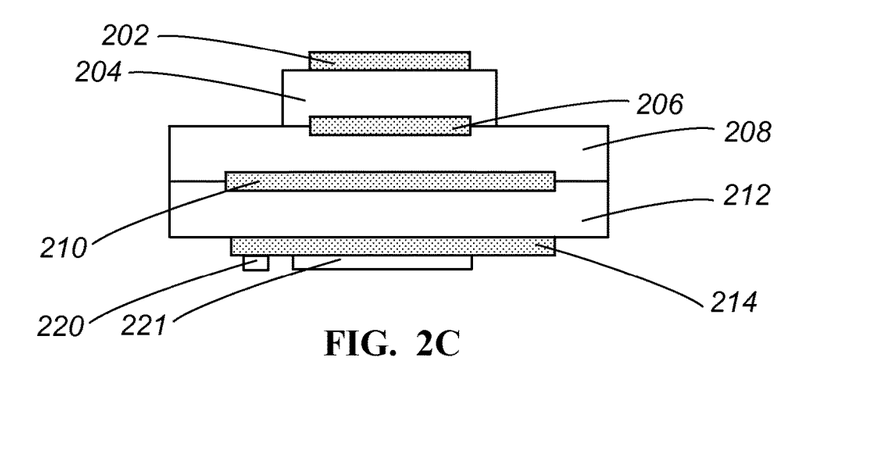

FIGS. 2A-2C are simplified diagrams of a dual-frequency patch antenna in accordance with an embodiment. These figures show a first conductive element 202, a first dielectric material 204, a second conductive element 206, and a second dielectric material 208. FIG. 2C, which is a cross-sectional view along line B-B in FIG. 2B, also shows a ground plane 210, a third dielectric material 212, routing and placement layer 114, circuitry 221, and an output 220. Each of the layers and/or components may include features similar to those described above with regard to FIGS. 1A-1E. As can be seen from the dotted line in FIG. 2A, and in the cross section of FIG. 2C, the second conductive element 206 in this embodiment is approximately the same size as the first conductive element 202. The sizes of the first conductive element 202 and the second conductive element 206 may be determined in accordance with known techniques and may depend at least in part on dielectric constants of the dielectric materials 204, 206.

Figure 3A:
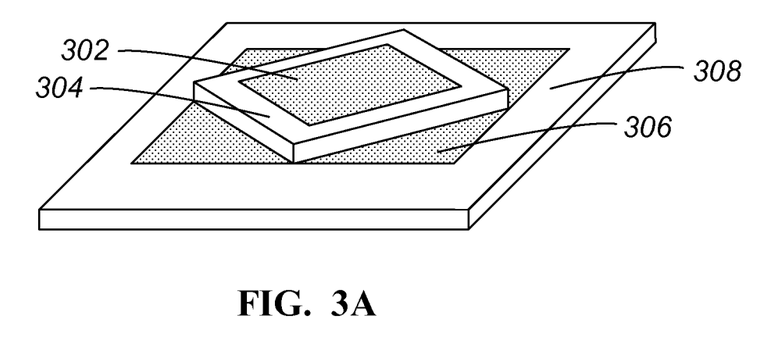
FIGS. 3A-3B are simplified diagrams of a dual-frequency patch antenna in accordance with another embodiment.
Figure 3B:
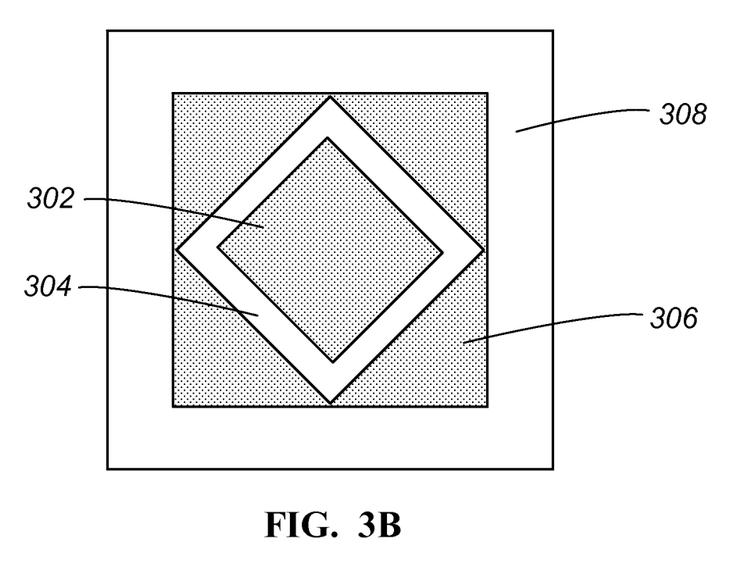

FIGS. 3A-3B are simplified diagrams of a dual-frequency patch antenna in accordance with another embodiment. In this embodiment, edges of a first conductive element 302 and a first dielectric material 304 are rotated relative to edges of a second conductive element 306 and a second dielectric material 308. Rotation can provide improved isolation between the conductive elements 302, 306 in some configurations and operating conditions. In some embodiments, the first conductive element 302 and the first dielectric material 304 may be rotated by about 45° (or between about 30° and 60°). Also, the first conductive element 302 and the first dielectric material 304 may be larger than shown in FIGS. 3A-3B, so that corners of the first conductive element 302 and the first dielectric material 304 extend past edges of the second conductive element 306. Although not specifically shown, this embodiment may also include a ground plane, third dielectric material, routing and placement layer, circuitry, and output similar the embodiments shown in FIGS. 1C-1E and FIG. 2C. Each of the layers and/or components may include features similar to those described above with regard to FIGS. 1A-1E.

Figure 4A:
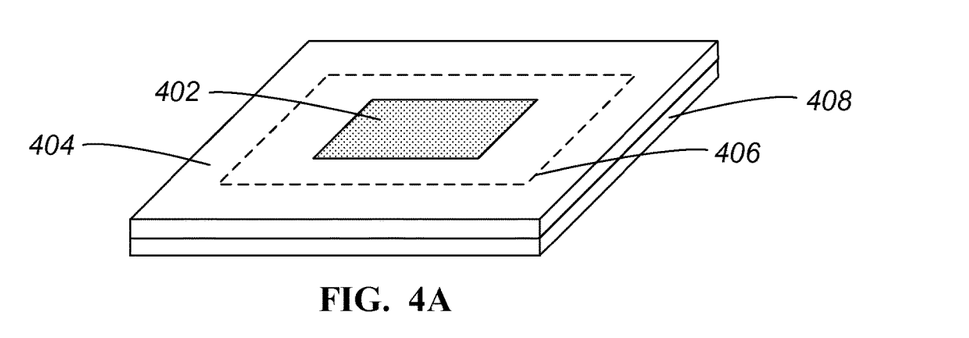
FIGS. 4A-4C are simplified diagrams of a dual-frequency patch antenna in accordance with another embodiment.
Figure 4B:
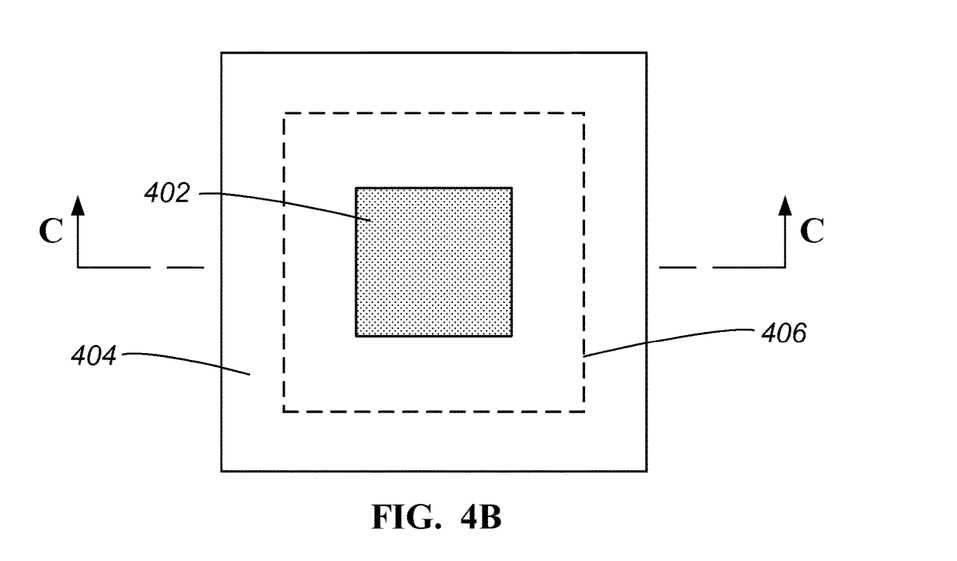
Figure 4C:
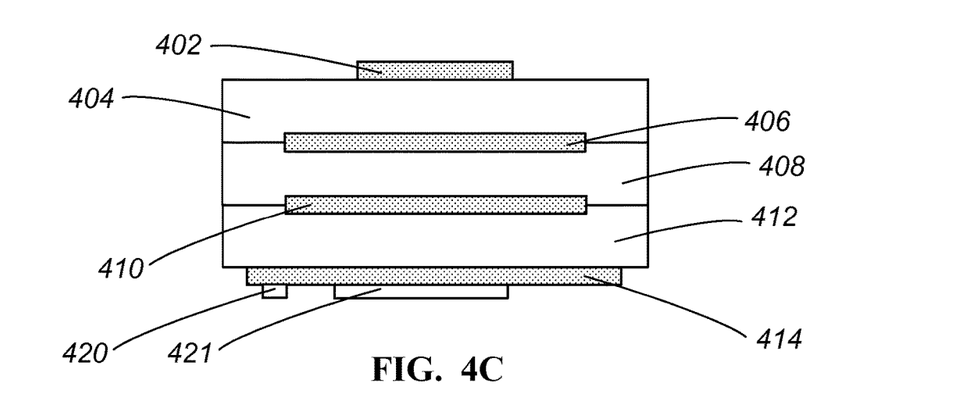

FIGS. 4A-4C are simplified diagrams of a dual-frequency patch antenna in accordance with another embodiment. These figures show a first conductive element 402, a first dielectric material 404, a second conductive element 406, and a second dielectric material 408. FIG. 4C, which is a cross-sectional view along line C-C in FIG. 4B, also shows a ground plane 410, a third dielectric material 412, routing and placement layer 414, circuitry 421, and an output 420. In this embodiment, a first dielectric material 404 is approximately the same size as a second dielectric material 408. Also, as shown by the dotted line in FIGS. 4A-4B, the first conductive element 402 is smaller than the second conductive element 404 in this embodiment, although as described with regard to other embodiments, the conductive elements 402, 406 may be approximately the same size. Each of the layers and/or components may include features similar to those described above with regard to FIGS. 1A-1E.

Figure 5A:
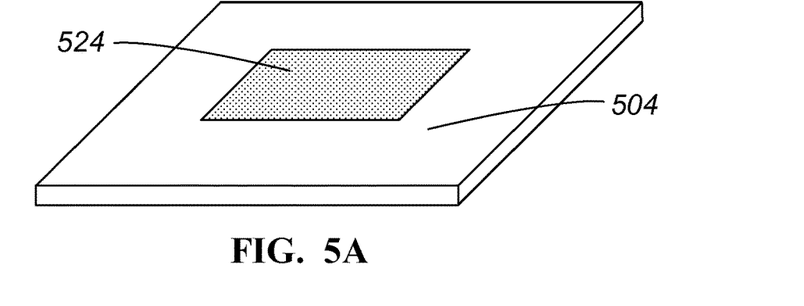
FIGS. 5A-5C are simplified diagrams of a dual-frequency patch antenna in accordance with another embodiment.
Figure 5B:
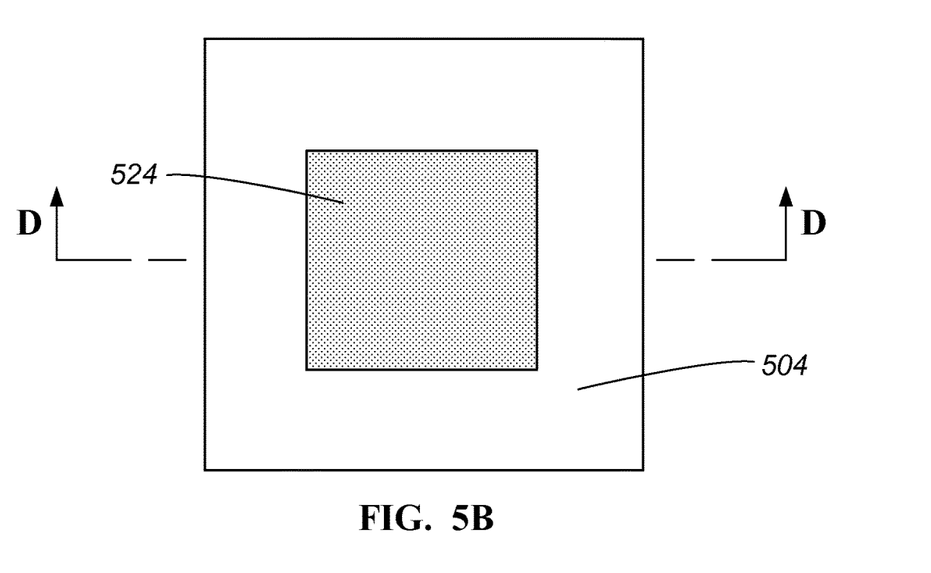
Figure 5C:
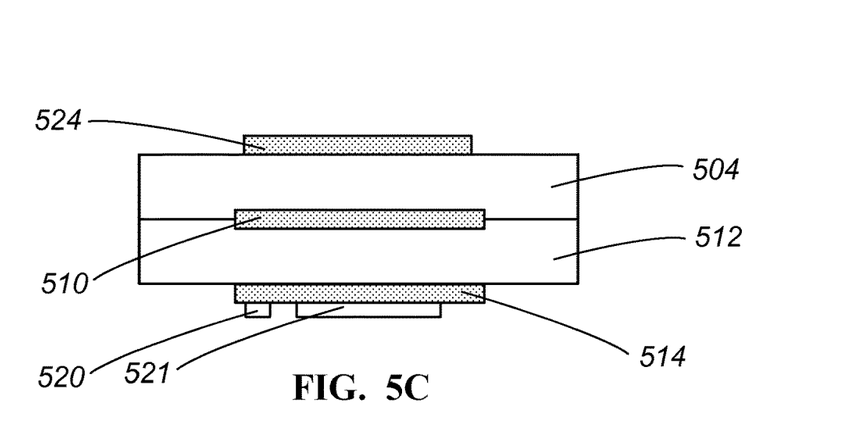

FIGS. 5A-5C are simplified diagrams of a dual-frequency patch antenna in accordance with another embodiment. These figures show a conductive element 524 and a top dielectric material 504. FIG. 5C, which is a cross-sectional view along line D-D in FIG. 5B, also shows a ground plane 510, a bottom dielectric material 512, routing and placement layer 514, circuitry 521, and an output 520. Each of the layers and/or components may include features similar to those described above with regard to FIGS. 1A-1E. For example, the bottom dielectric material 512 may include one or more conductive routing layers each disposed between adjacent dielectric layers as described above with regard to the third dielectric material 112 in FIGS. 1C-1E. In this embodiment, the conductive element 524 is configured in accordance with known techniques to receive GNSS signals at both a first frequency band and a second frequency band. One advantage of this embodiment is a lower height (because one dielectric layer and one conductive layer are eliminated). This can also reduce weight and cost.

Figure 6:
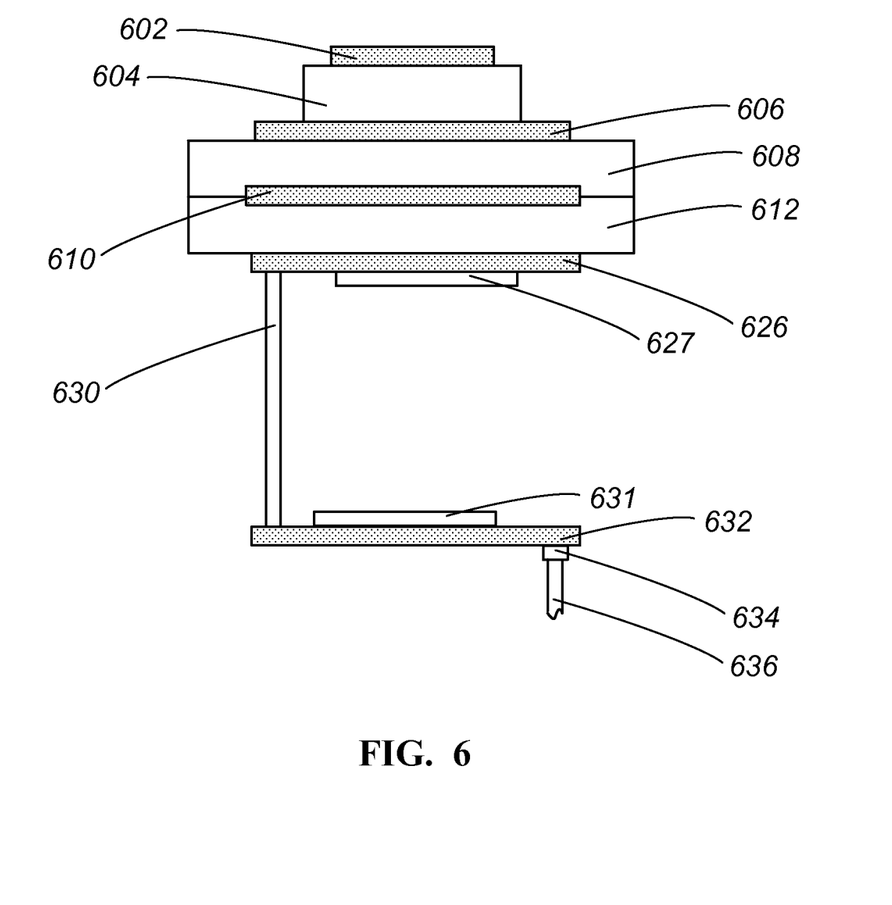
FIG. 6 is a simplified cross-sectional view of a dual-frequency patch antenna in accordance with another embodiment.

FIG. 6 is a simplified cross-sectional view of a patch antenna in accordance with another embodiment. This embodiment includes a first conductive element 602, a first dielectric material 604, a second conductive element 606, a second dielectric material 608, a ground plane 610, and a third dielectric material 612. Each of the layers may include features similar to those described above with regard to FIGS. 1A-1E. This embodiment also includes a first routing and placement layer 626, first circuitry 627, a second routing and placement layer 632, and second circuitry 631 coupled via an interface 630. The interface 630 may be, for example, a cable or trace configured to convey RF signals. Similar to the circuitry 121 described above with regard to FIGS.

1C-1E, the first circuitry 627 and the second circuitry 631 may include conventional electronic components for providing frequency selection, down conversion, and digitization of GNSS signals received by the first conductive element 602 and the second conductive element 606.

In some embodiments, the first circuitry 627 may be configured to provide amplified and filtered GNSS signals to the second circuitry 631, and the second circuitry 631 may be configured to provide down conversion and digitization of the amplified and filtered GNSS signals.

In other embodiments, the first circuitry 627 may be configured to provide amplified, filtered, and down converted GNSS signals to the second circuitry 631, and the second circuitry 631 may be configured to provide digitization of the amplified, filtered, and down converted GNSS signals.

In either case, digitized baseband signals may be provided at an output 634 for wireless or wired transmission. Wired transmission may be via a digital cable as described previously. The digitized baseband signals may be transmitted to a soft GNSS receiver on a communication device for typical GNSS measurements and determination of position fixes associated with the dual-frequency patch antenna.

This embodiment may allow for the first routing and placement layer 626 and first circuitry 627 to be smaller than the routing and placement layer with circuitry described above with regard to FIGS. 1C-1E (and thus reduce a size, weight, and/or cost of the dual-frequency patch antenna), and it may also allow for some of the GNSS signal processing to be performed at the second circuitry 631 that may be located in a more convenient location. The second routing and placement layer 632 with the second circuitry 631 may be located within the same housing as the first routing and placement layer 626 with the first circuitry 627 (part of the same device) or in a different housing (part of a different device).

At least a portion of each of the embodiments of dual-frequency patch antennas described herein may be formed using known PCBA processes, and in some embodiments, the entire dual-frequency patch antenna may be formed using PCBA processes. For example, with regard to FIGS. 1A-1E, the first conductive layer 102, the second conductive layer 106, the ground plane 110, and/or the routing and placement layer 114 (and/or part of the circuitry) may be formed from thin metal layers commonly used in PCBA processes. The various shapes and sizes of the conductive layers may be formed using known PCBA etching processes. Electronic components, including the output 120, may be mounted on the routing and placement layer 114 using known PCBA surface mount processes.

Also, the first dielectric layer 104, the second dielectric layer 108, and/or the third dielectric layer 112 may be formed from PCB cores or pre-preg layers using known PCBA processes. One or more feeds may be formed extending through one or more of the dielectric materials 104, 108, 112 and connecting to one or more conductive layers using known PCBA via etching and plating techniques.

Figure 7A:
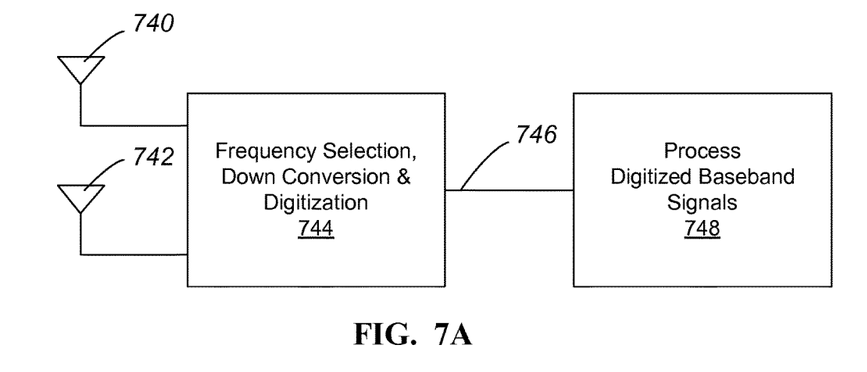
FIGS. 7A-7C are simplified block diagrams showing signal processing operations performed by circuitry of dual-frequency patch antennas and by a processor of a communication device in accordance with some embodiments.
Figure 7B:
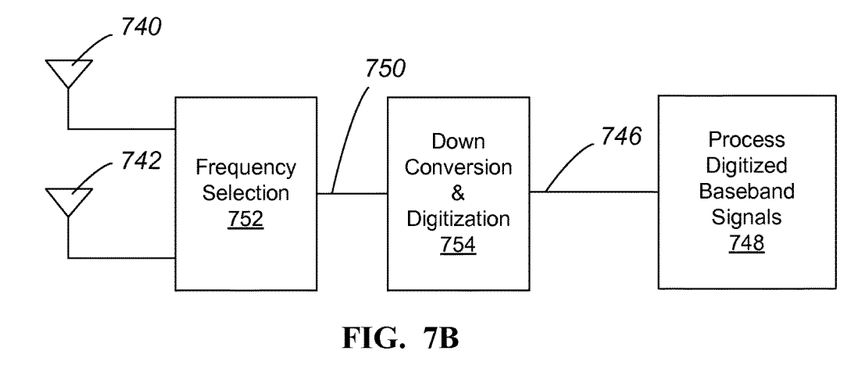
Figure 7C:
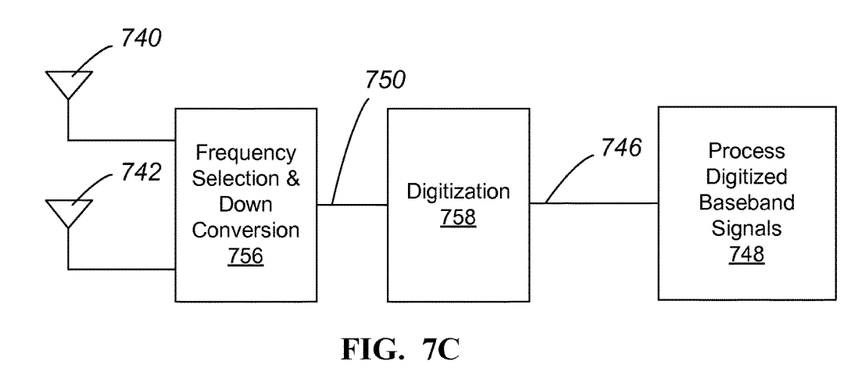

FIGS. 7A-7C are simplified block diagrams showing signal processing operations performed by circuitry of dual-frequency patch antennas and by a processor of a communication device in accordance with some embodiments. For example, FIG. 7A shows in block diagram a dual-frequency patch antenna that includes two conductive elements 740, 742 for reception of signals at different GNSS frequencies. Frequency selection, down conversion, and digitization operations 744 are performed by circuitry of the dual-frequency patch antenna. Digitized baseband signals are output either wirelessly or via a digital cable 746. Processing of the digitized baseband signals at operation 748 is performed by one or more processors of a communication device.

FIG. 7B also shows in block diagram a dual-frequency patch antenna that includes two conductive elements 740, 742 for reception of signals at different GNSS frequencies. Frequency selection operations 752 are performed by first circuitry, and down conversion and digitization operations 754 are performed by second circuitry. The first circuitry may be part of the dual-frequency patch antenna, and the second circuitry may be part of the dual-frequency patch antenna or it may be located separately. The first and second circuitry are coupled via an RF cable 750. Digitized baseband signals are output from the second circuitry either wirelessly or via a digital cable 746. Processing of the digitized baseband signals at operation 748 is performed by one or more processors of a communication device.

FIG. 7C also shows in block diagram a dual-frequency patch antenna that includes two conductive elements 740, 742 for reception of signals at different GNSS frequencies. Frequency selection and down conversion operations 756 are performed by first circuitry, and digitization operations 758 are performed by second circuitry. The first circuitry may be part of the dual-frequency patch antenna, and the second circuitry may be part of the dual-frequency patch antenna or it may be located separately. The first and second circuitry are coupled via an RF cable 750. Digitized baseband signals are output from the second circuitry either wirelessly or via a digital cable 746. Processing of the digitized baseband signals at operation 748 is performed by one or more processors of a communication device.

It should be appreciated that the specific steps illustrated in FIGS. 7A-7C provide particular operations and sequences according to some embodiments. Other operations and/or sequences may also be performed according to alternative embodiments. For example, alternative embodiments may perform the operations outlined above in a different order. Moreover, the individual operations illustrated in FIGS. 7A-7C may include multiple sub-steps that may be performed in various sequences. Furthermore, additional operations may be added or removed depending on the particular application.

It should be appreciated that some embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A dual-frequency patch antenna comprising:
a first conductive element configured to receive global navigation satellite system (GNSS) signals at a first frequency band;
a first dielectric material coupled to a backside of the first conductive element;
a second conductive element coupled to a backside of the first dielectric material, the second conductive element configured to receive GNSS signals at a second frequency band, wherein the second conductive element has a topside with an area at least as large as a topside of the first conductive element;
a second dielectric material coupled to a backside of the second conductive element, wherein edges of the first conductive element and the first dielectric material are rotated by between about 30° to 60° relative to edges of the second conductive element and the second dielectric material;
a ground plane coupled to a backside of the second dielectric material;
a third dielectric material coupled to a backside of the ground plane;
a routing and placement layer with circuitry coupled to a backside of the third dielectric material, the circuitry electrically coupled to at least one of the first conductive element or the second conductive element; and
a digital cable coupled to the circuitry via the routing and placement layer, wherein the circuitry is configured to:
provide frequency selection, down conversion, and digitization of the GNSS signals at the first frequency band and the GNSS signals at the second frequency band; and
output digitized baseband signals, wherein the digital cable is configured to provide the digitized baseband signals to a soft GNSS receiver.

2. The dual-frequency patch antenna of claim 1 wherein the GNSS signals at the first frequency band are L1 GNSS signals, and the GNSS signals at the second frequency band are at least one of L2 GNSS signals, L2C GNSS signals, or L5 GNSS signals.

3. The dual-frequency patch antenna of claim 1 wherein the digital cable is a universal serial bus (USB) cable or an Ethernet cable.

4. The dual-frequency patch antenna of claim 1 wherein the third dielectric material comprises one or more conductive routing layers each disposed between adjacent dielectric layers.

5. The dual-frequency patch antenna of claim 1 wherein edges of the first conductive element and the first dielectric material are rotated by about 45° relative to edges of the second conductive element and the second dielectric material.

6. The dual-frequency patch antenna of claim 1 further comprising one or more feeds electrically coupling the first conductive element to the circuitry, wherein the second conductive element is electrically isolated from the circuitry and is capacitively coupled to the first conductive element.

7. Using one or more printed circuit board assembly (PCBA) processes to form the second conductive element, the ground plane, the second dielectric material, and the third dielectric material of the dual-frequency patch antenna recited in claim 1.

8. A dual-frequency patch antenna system comprising:
a first conductive element configured to receive global navigation satellite system (GNSS) signals at a first frequency band;
a second conductive element configured to receive GNSS signals at a second frequency band;
a ground plane;
first circuitry electrically coupled to at least one of the first conductive element or the second conductive element and physically coupled to a first routing and placement layer, the first circuitry configured to provide at least frequency selection of the GNSS signals at the first frequency band and the GNSS signals at the second frequency band;
second circuitry electrically coupled to the first circuitry via an interface and physically coupled to a second routing and placement layer separate from the first routing and placement layer, the second circuitry configured to provide digitized baseband signals to an output;
a first dielectric material disposed between the first conductive element and the second conductive element;
a second dielectric material disposed between the second conductive element and the ground plane, the second dielectric material having a topside with an area at least as large as a topside of the ground plane; and
a third dielectric material disposed between the ground plane and the first routing and placement layer, wherein the second routing and placement layer is not directly coupled to any of the first dielectric material, the second dielectric material, or the third dielectric material.

9. The system of claim 8 wherein the third dielectric material comprises one or more conductive routing layers each disposed between adjacent dielectric layers.

10. The system of claim 8 wherein the second circuitry is also configured to:
provide down conversion and digitization of the GNSS signals at the first frequency band and the GNSS signals at the second frequency band; and
provide the digitized baseband signals to the output.

11. The system of claim 8 wherein the interface is configured to provide filtered and amplified GNSS signals from the first circuitry to the second circuitry, the second circuitry configured to:
provide down conversion and digitization of the filtered and amplified GNSS signals; and
provide the digitized baseband signals to the output.

12. The system of claim 8 wherein the first circuitry is configured to filter, amplify, and down convert the GNSS signals at the first frequency band and the GNSS signals at the second frequency band, and the interface is configured to provide the filtered, amplified, and down converted GNSS signals from the first circuitry to the second circuitry, the second circuitry configured to:
provide digitization of the filtered, amplified, and down converted GNSS signals; and
provide the digitized baseband signals to the output.

13. The system of claim 8 wherein the first circuitry includes elements to filter, amplify, downconvert, and digitize the GNSS signals at the first frequency band and the GNSS signals at the second frequency band, but does not include elements to perform pseudorange and carrier phase measurements.

14. The system of claim 8 further comprising one or more feeds electrically coupling the first conductive element to the first circuitry.

15. The system of claim 8 wherein the second conductive element is electrically isolated from the first circuitry and is capacitively coupled to the first conductive element.

16. Using one or more printed circuit board assembly (PCBA) processes to form the second conductive element, the ground plane, the second dielectric material, and the third dielectric material of the system recited in claim 8.

17. A dual-frequency patch antenna comprising:
a first conductive element configured to receive global navigation satellite system (GNSS) signals at a first frequency band;
a second conductive element configured to receive GNSS signals at a second frequency band;
a ground plane;
a first dielectric material disposed between the first conductive element and the second conductive element;
a second dielectric material disposed between the second conductive element and the ground plane, wherein edges of the first conductive element and the first dielectric material are rotated by between about 30° to 60° relative to edges of the second conductive element and the second dielectric material, and the second dielectric material has a topside with an area at least as large as the topside of the ground plane; and
a third dielectric material disposed adjacent to a bottom of the ground plane, the third dielectric material comprising one or more conductive routing layers each disposed between adjacent dielectric layers.

18. The dual-frequency patch antenna of claim 17 wherein the first dielectric material has a topside with an area that is substantially the same size as the topside of the second dielectric material.

19. The dual-frequency patch antenna of claim 17 further comprising:
circuitry coupled to at least one of the one or more conductive routing layers and electrically coupled to at least one of the first conductive element or the second conductive element, the circuitry configured to filter, amplify, downconvert, and digitize the GNSS signals at the first frequency band and the GNSS signals at the second frequency band without performing pseudorange and carrier phase measurements.

20. Using one or more printed circuit board assembly (PCBA) processes to form the second conductive element, the ground plane, and the second dielectric material of the dual-frequency patch antenna recited in claim 17.

* * * * *